(12) United States Patent
Lafleur et al.

(10) Patent No.: US 12,366,647 B1
(45) Date of Patent: Jul. 22, 2025

(54) SYSTEM, METHOD AND APPARATUS FOR LINKED TRAILER IDENTIFICATION

(71) Applicant: ORBCOMM, INC., Rochelle Park, NJ (US)

(72) Inventors: Phil Lafleur, Ontario (CA); Ronald Straz, Annandale, VA (US)

(73) Assignee: ORBCOMM, INC., Rochelle Park, NJ (US)

( * ) Notice: Subject to any disclaimer, the term of this patent is extended or adjusted under 35 U.S.C. 154(b) by 174 days.

(21) Appl. No.: 17/562,806

(22) Filed: Dec. 27, 2021

Related U.S. Application Data (60) Provisional application No. 63/130,846, filed on Dec. 27, 2020.

(51) Int. Cl.
*G01S 13/76* (2006.01)
*H04W 76/11* (2018.01)

(52) U.S. Cl.
CPC ........... *G01S 13/765* (2013.01); *H04W 76/11* (2018.02)

(58) Field of Classification Search
CPC .............................. G01S 13/765; H04W 76/11
See application file for complete search history.

(56) References Cited

U.S. PATENT DOCUMENTS

| | | | | |
|---|---|---|---|---|
| 2010/0117817 | A1* | 5/2010 | Kranz | B60Q 1/543 340/463 |
| 2019/0064835 | A1* | 2/2019 | Hoofard | G05D 1/228 |
| 2020/0184412 | A1* | 6/2020 | Champa | H04W 4/40 |
| 2021/0300355 | A1* | 9/2021 | Sato | B60W 30/0953 |

* cited by examiner

*Primary Examiner* — William Kelleher
*Assistant Examiner* — Ismaaeel A. Siddiquee (57) ABSTRACT

The present invention provides a system and method which allow for the rapid and reliable identification of towed trailers parked together in loading areas. According to a first preferred embodiment, an exemplary method of the present includes: monitoring hook-up criteria indicating that the first truck is maneuvering to hook-up with the first trailer; scanning for one or more transmitting devices when hook-up event criteria are met; determining which transmitting devices are sufficiently close to require an angle calculation based on RSSI levels; performing an Angle of Departure/Angle of Arrival calculation for each of the selected signals; determining which of the closest identified trailers have an Angle of Departure/Angle of Arrival which falls within a pre-set threshold; identifying a hook-up trailer based on detecting the Angle of Arrival/Angle of Departure and the compared RSSI levels; pairing the hook-up trailer ID device with a tractor ID device of the first truck; and transmitting paired ID information linking the hook-up trailer ID and the tractor ID device.

1 Claim, 6 Drawing Sheets

SYSTEM, METHOD AND APPARATUS FOR LINKED TRAILER IDENTIFICATION

RELATED APPLICATIONS

The present application claims priority to U.S. Provisional Application No. 63/130,846 filed Dec. 27, 2020.

FIELD OF THE PRESENT INVENTION

The present invention relates to an apparatus and system for identifying and tracking linked cargo trailers during transport.

BACKGROUND OF THE INVENTION

Figure 1:
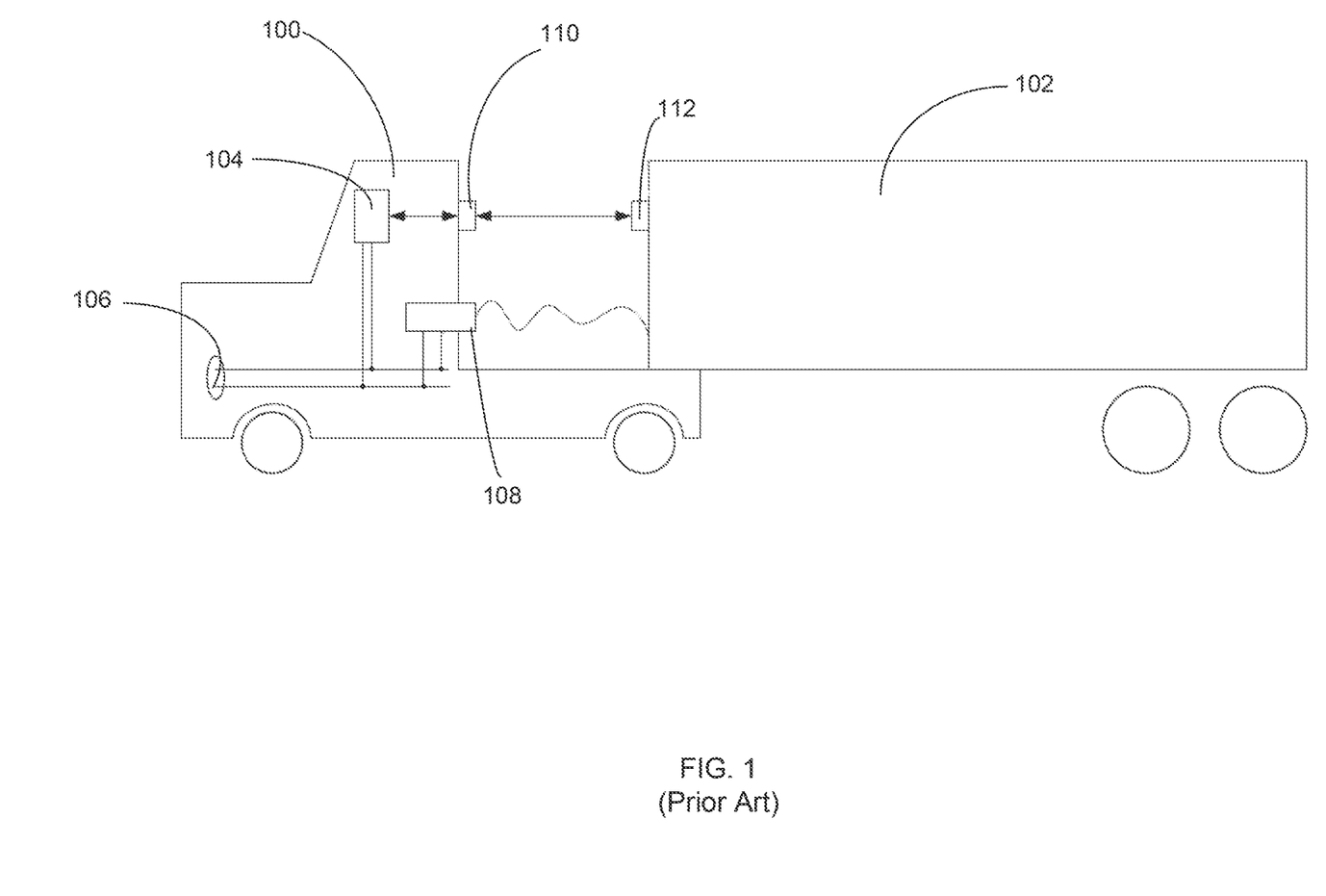
FIG. 1 is a diagram illustrating a truck and trailer combination as known in the prior art.

Modern distribution systems rely heavily on towed trailers which are transported by heavy trucks or "tractors." An example "tractor-trailer" system as known in the prior art is shown in FIG. 1. Specifically, a heavy truck 100 is shown connected to a given trailer 102 for towing and transport. Commonly, heavy trucks 100 today use on-board telematics systems which commonly include an in-cab controller 104 which controls, displays, stores and transmits system data.

The in-cab devices 104 commonly receive data from the vehicle's Controller Area Network bus (CAN bus) 106 and other devices and systems. As shown, the in-cab controller 104 also may receive data from a linked trailer 102. Such data may be received from physically tethered inputs 108. Additionally, the trailer 102 may be identified by a wireless ID device 112 which may be wirelessly linked to a Tractor ID device 110.

Figure 2:
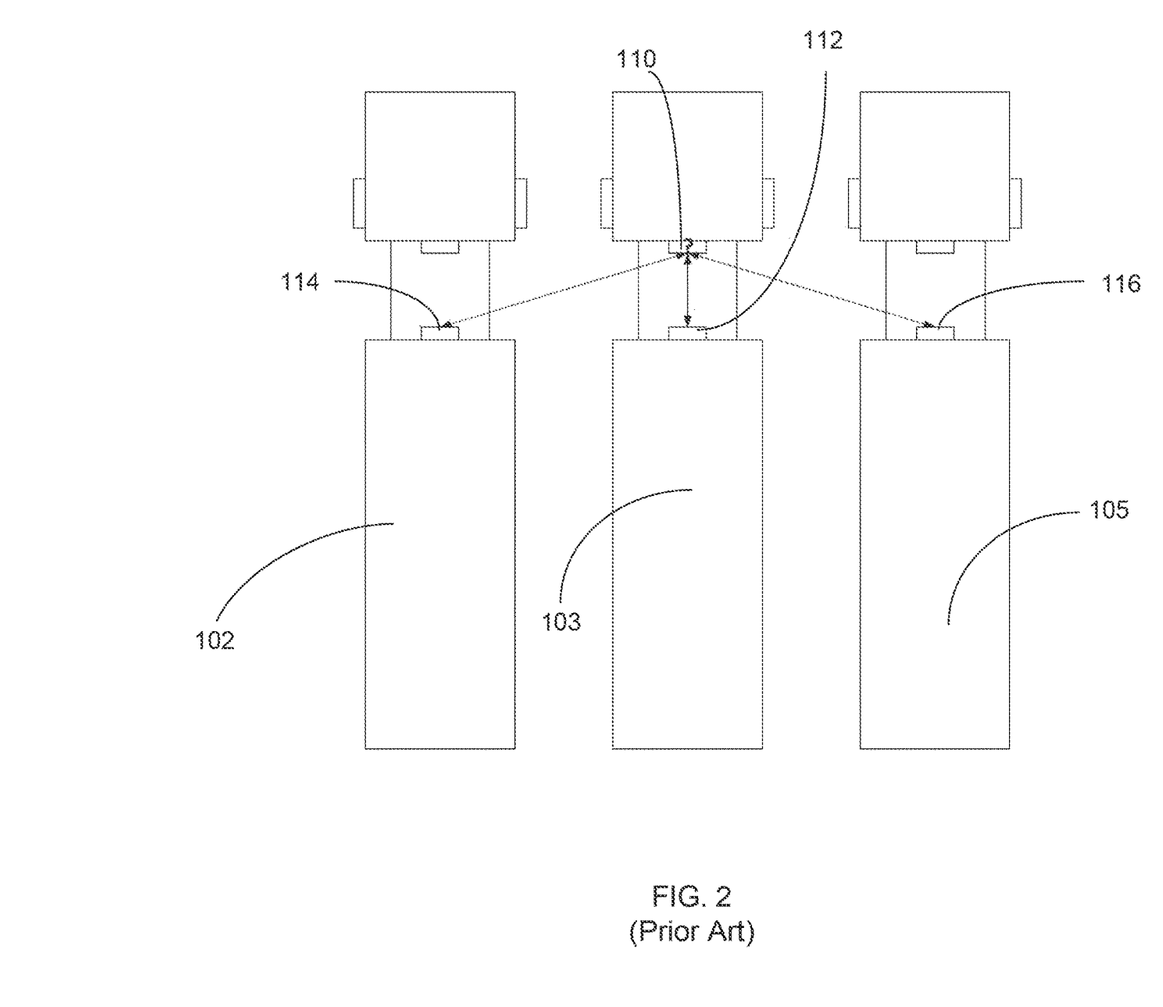
FIG. 2 is a diagram illustrating a group of truck and trailer combinations parked together in a given loading yard.

As shown in FIG. 2, during distribution, individual trailers are commonly parked together at a variety of loading areas/depos/yards. At these locations, individual trailers 102, 103, 105 are loaded and/or unloaded, and then picked up for transportation by an assigned truck. Because trailers are commonly parked together (within a few feet of each other), current telematics systems have a difficult time identifying any individual trailer. In the example shown in FIG. 2, the Tractor ID device 110 cannot reliably distinguish the linked trailer ID device 112 from adjacent trailer ID devices 114, 116. For this reason, telematics systems cannot reliably confirm the linked combination of each truck and trailer as they connect, and leave given loading areas, depots, or yards. To overcome the limitations of the prior art, a novel system and method are needed which allow for the rapid and reliable identification of towed trailers parked together in loading areas.

SUMMARY OF THE PRESENT INVENTION

To address the shortcomings presented in the prior art, the present invention provides a system and method which allow for the rapid and reliable identification of towed trailers parked together in loading areas.

According to a first preferred embodiment, an exemplary method of the present includes: monitoring hook-up criteria indicating that the first truck is maneuvering to hook-up with the first trailer; scanning for one or more transmitting devices when hook-up event criteria are met; determining which transmitting devices are sufficiently close to require an angle calculation based on RSSI levels; performing an Angle of Departure/Angle of Arrival calculation for each of the selected signals; determining which of the closest identified trailers have an Angle of Departure/Angle of Arrival which falls within a pre-set threshold; identifying a hook-up trailer based on detecting the Angle of Arrival/Angle of Departure and the compared RSSI levels; pairing the hook-up trailer ID device with a tractor ID device of the first truck; and transmitting paired ID information linking the hook-up trailer ID and the tractor ID device.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The following discussion addresses a number of preferred embodiments and applications of the present invention. It is to be understood that other embodiments may be utilized, and changes may be made without departing from the scope of the present invention.

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be listed in the specification and all such embodiments are intended to be included within the scope of that term or terms. As used throughout this application, the word "may" is used in a permissive sense (i.e., meaning "having the potential to'), rather than the mandatory sense (i.e. meaning "must").

The communication elements of the present invention as discussed below may include any of a mix modulators, demodulators and/or receivers for a range of protocols including (but not limited to): Bluetooth, Bluetooth Low Energy ("BLE"), ZigBee, Thread, Wi-Fi (802.11xxx), 2G-5G, LTE, NFC, RFID, and DigiMesh protocols. Further, the communication elements may be wired, wireless, or combinations thereof and may include components such as modems, gateways, switches, routers, hubs, access points, repeaters, towers, and the like. Communication and control systems of the present invention may also include signal or data transmitting and receiving circuits, such as antennas, amplifiers, filters, mixers, oscillators, digital signal processors (DSPs), and the like.

The in-cab controller as discussed below may also include additional wireless transceivers such as: broadband and/or narrowband wireless transceivers, a satellite transceiver, and/or a GPS/GNSS receiver or the like. As discussed further below, the tractor and trailer directed BLE antennas may preferably be arranged and configured to communicate with tags, sensors and systems attached to the trailer such as: door sensors; distributed cargo sensors, main cargo sensors; tire pressor monitoring systems, braking systems, any BLE tags located on the chassis, pallet sensors, motion sensors, load sensors and the like. The in-cab controller may also preferably further communicate with remote systems via the internet, IoT cloud or the like. The in-cab controller may further access remote data sources which may include remote servers and databases.

As referred to above, all communications of the present invention may be designed to be duplex or simplex in nature. Further, as needs require, the processes for transmitting data to and from the present invention may be designed to be push or pull in nature. Still further, each feature of the present invention may be made to be remotely activated and accessed from distant monitoring stations. Accordingly, data may be uploaded to and downloaded from the present invention as needed.

Referring now to FIGS. 3-6, aspects of an exemplary data sensing and processing system in accordance with the present invention shall now be discussed. As should be understood, the systems disclosed in FIGS. 3-6 are exemplary systems onto which the features of the present invention may be integrated. Accordingly, the figures are intended to be illustrative and any of a variety of systems may be used with the present invention without limitation. Although the present invention is shown and discussed specifically with respect to a tractor-trailer arrangement (i.e., a tractor unit attached to a box trailer), these are examples only. The present invention may equally be used with any other type of container and/or truck arrangement without limitation. Alternatives may include any type of truck, semi-truck, refrigerated trailer, shipping container, intermodal container, container chassis or the like.

Figure 3:
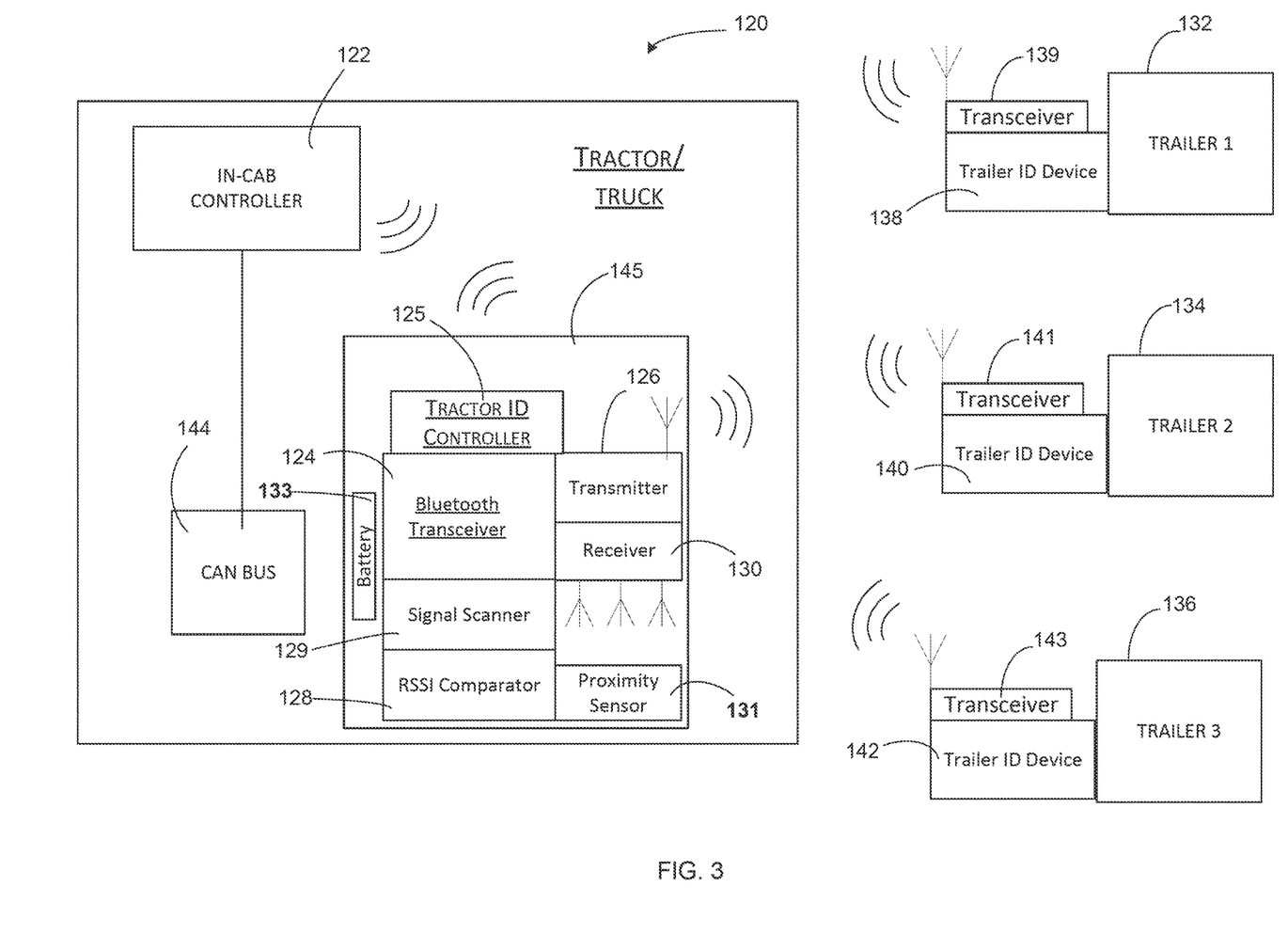
FIG. 3 is a block diagram of an exemplary trailer identification system in accordance with a first preferred embodiment of the present invention.

With reference now to FIG. 3, a first block diagram of an exemplary trailer identification system 120 in accordance with aspects of the present invention is provided. As shown, the system 120 preferably includes a controller 122 which preferably may be an in-cab controller or the like. The controller 122 may preferably be linked to a central CAN bus 144 and other sensor systems. The system 120 preferably also includes a Tractor ID device 145 which is preferably secured to the rear of a given tractor/truck 120 and preferably connected via wirelessly via BLE. Alternatively, the Tractor ID device 145 may be placed on any surface of the truck 120.

A battery 133 can be included to make the implementation fully wireless. For a fully wireless battery powered system, low power consumption is important. This may be facilitated by keeping the device in a sleep mode most of the time and waking periodically to check for trailers and other vehicles in close proximity.

The system 120 can also function without the in-cab controller 122 and CAN bus 144. In this case, the pairing between the tractor and trailer may be conducted via the internet, IoT cloud or the like by the Trailer ID device 140. In a preferred embodiment, this pairing may occur over a cellular terrestrial or mobile satellite communication link.

As shown, the Tractor ID device 145 preferably may include a device controller 125 and any number of additional components. According to a preferred embodiment, the Tractor ID device 145 preferably may include a Bluetooth enabled transceiver 124 which preferably supports at least version 5.1 of the Bluetooth® Core Specification (which is hereby incorporated by reference in its entirety). As shown, the Bluetooth enabled transceiver 124 preferably includes a Bluetooth transmitter 126 and a Bluetooth receiver 130. According to a further preferred embodiment, the Bluetooth transceiver 124 of the present invention preferably includes a controller which supports Bluetooth direction of arrival (DoA) capability as provided for in version 5.1 of the Bluetooth Core Specification.

As shown, the Tractor ID device 145 preferably may include a millimeter-wave radar proximity sensor 131 with a directional antenna that detects when a tractor is within a configurable threshold distance from the trailer as discussed later in reference to FIG. 5.

As further shown in FIG. 3, the Tractor ID device 145 preferably may include a signal scanner 129 and an RSSI Comparator 128. The signal scanner 129 and RSSI Comparator 128 may be functional modules built within the Bluetooth transceiver 124. Alternatively, the signal scanner 129 and/or the RSSI Comparator 128 may be incorporated into and/or provided as one or more separate processors linked to the device controller 125.

Figure 4:
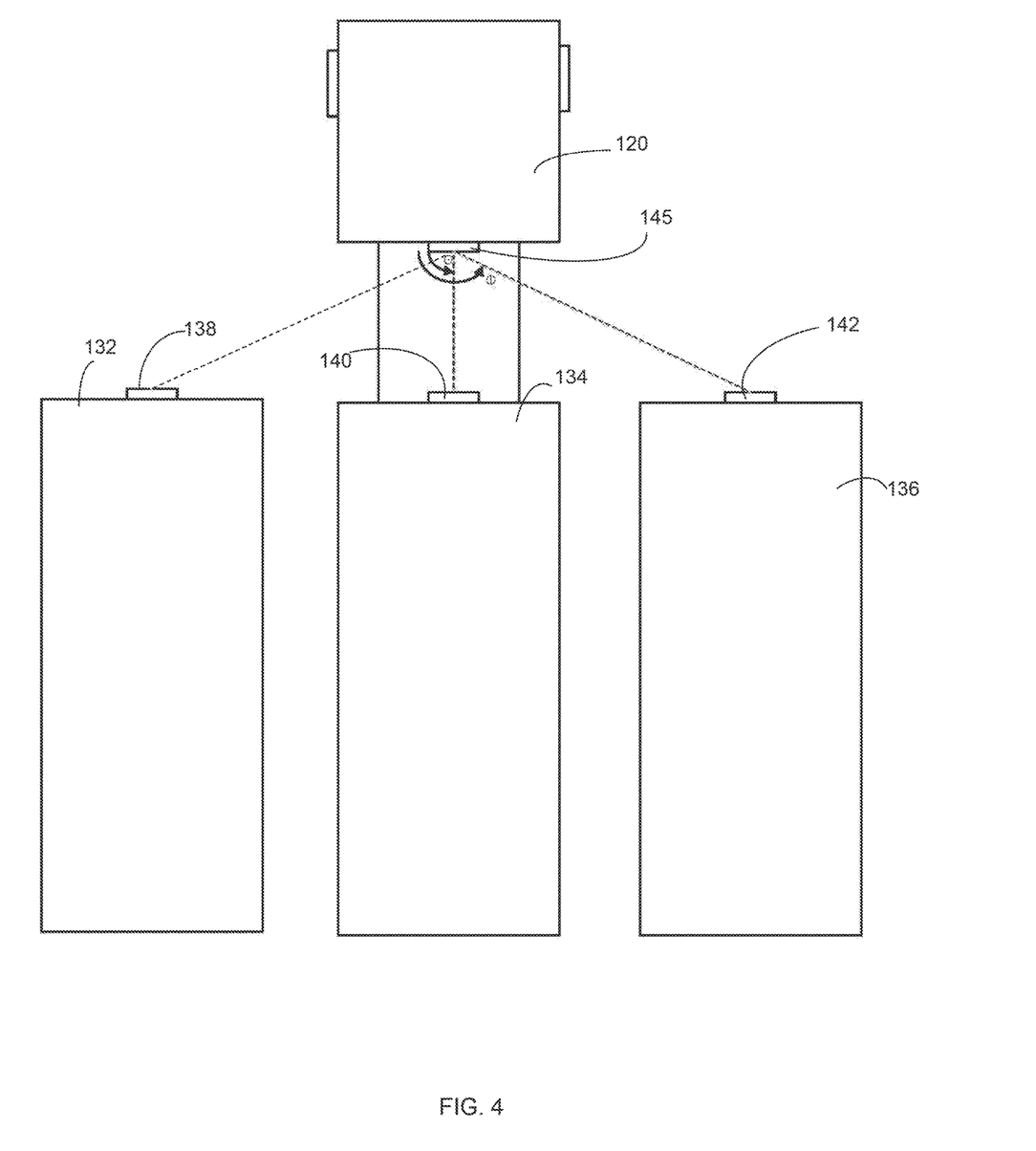
FIG. 4 is a schematic diagram illustrating a truck and trailer employing an exemplary system of the present invention.

With further reference to FIG. 3, a group of trailers 132, 134, 136 are shown each with an attached Trailer ID device 138, 140, 142. Preferably, each Trailer ID device 138, 140, 142 may preferably include a variety of components for reporting monitored events detected on each respective trailer 132, 134, 126. At a minimum, each Trailer ID device 138, 140, 142 preferably includes a Bluetooth transceiver 139, 141, 143 which is capable of communicating with the Bluetooth enabled transceiver 124 as discussed further below. FIG. 4 provides a schematic, overhead view of an exemplary physical relationship between the tractor 120, the Tractor ID device 145, and each of the trailers 132, 134, 136 and their respective Trailer ID devices 138, 140, 142.

Figure 5:
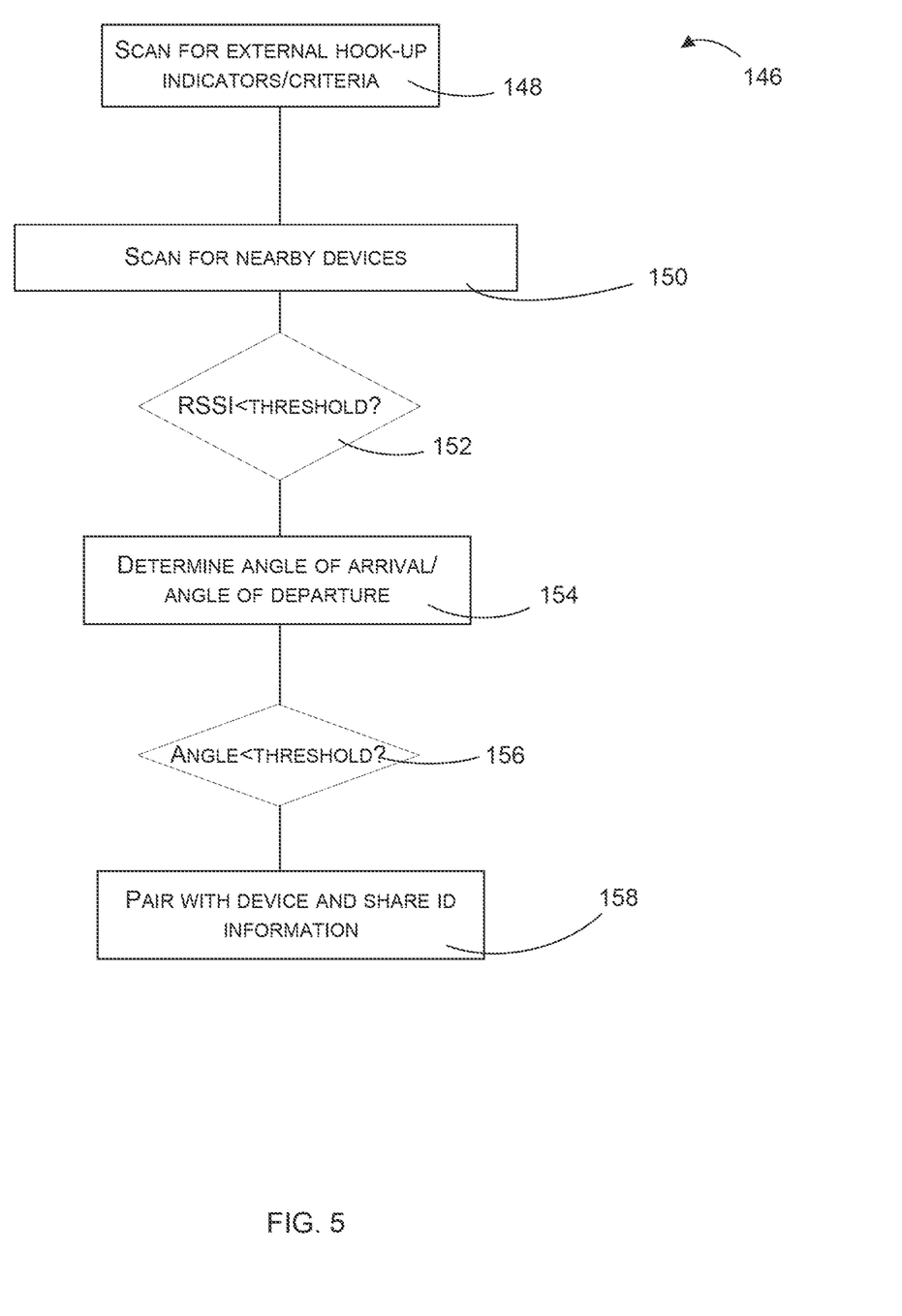
FIG. 5 is a block diagram illustrating an exemplary method for implementing aspects of the present invention.
Figure 6:
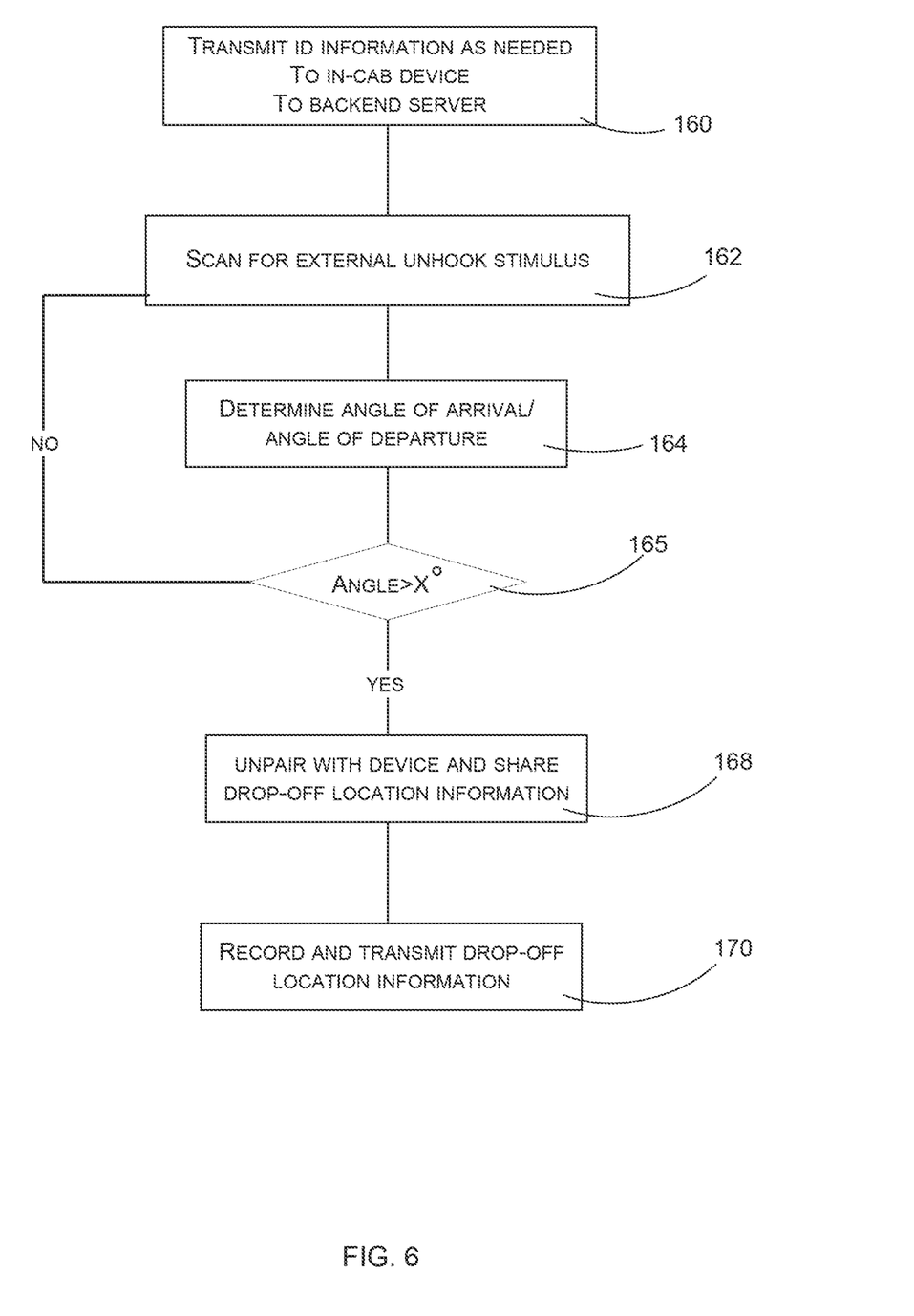
FIG. 6 is a block diagram illustrating further exemplary steps of the method shown in FIG. 5.

With reference now to FIGS. 5 and 6, an exemplary method 146 for implementing aspects of the present invention shall now be discussed. As shown in FIG. 5, at a first step 148, the system of the present invention may preferably monitor sensors for criteria/indications that the truck is potentially maneuvering to hook-up with a given trailer. According to a preferred embodiment, these hook-up event indicators/criteria may preferably include sensor output indicating a stop motion of the truck or user input indicating a hook-up event. Alternatively, the indicators/criteria may include sensor outputs indicating the truck being put into reverse while unhooked from a trailer. Additionally, the criteria may include the detection of proximity to a single trailer, more than one trailer, or to a selected number of additional trailers. The detection of proximity to one or more trailers may also be conditioned on a sensed indication that the truck is not currently hooked to a trailer. According to a further preferred embodiment, the proximity sensor 131 may be a millimeter-wave radar proximity sensor with a directional antenna that detects when a tractor is within a configurable threshold distance from the trailer. According to a further preferred embodiment, the initial sensor scan may also be initiated in response to entry into a geofenced location. Exemplary scanning criteria and optional co-incident criteria for identification of a hook-up event are further listed in Table 1 below.

TABLE 1

| Scanning Criteria | Optional Co-incident Criteria |
|---|---|
| Entry into Geofence | Not currently hooked to a trailer. Stop and/or Reverse Motion |
| Stop and/or Reverse Motion | Not currently hooked to a trailer. |
| Proximity to a selected number of trailers | Not currently hooked to a trailer. Truck speed below selected value. |
| Change in RPM/Gear Characteristics | Not currently hooked to a trailer. Truck speed below selected value. Detected grade/slope within a predetermined range (grade < Y°) |
| Unhooking from a trailer | Stop and/or Reverse Motion |
| Millimeter-wave radar proximity detection | Tractor within a predetermined distance from the trailer |

At a next step 150, once the controller determines that one or more hook-up event criteria are met, the system preferably scans for nearby devices. At a next step 152, the system preferably determines which received signals are sufficiently close to require an angle calculation. According to a preferred embodiment, this determination is preferably performed by the RSSI Comparator 128 which preferably identifies signals which exceed set RSSI levels and/or which are among a set number of strongest sources. Alternatively, another signal strength indicator may also be used (e.g., RX measurements).

For an embodiment without DoA, such as BLE5.0, a directional antenna may alternatively be used to provide angle-dependent filtering of the signals from adjacent trailers 132 and 136. This may preferably increase the RSSI reading for the desired trailer 134 while lowering the RSSI of adjacent trailers 134, especially as the tractor approaches the trailer 134. In one preferred embodiment, the directive antenna may include an array of two or more ceramic patch antennas fed in phase and separated by nominally ½ of the free space wavelength. In this case, steps 154 and 156 may be skipped.

At a next step 154, the system preferably performs an Angle of Arrival and/or Angle of Departure calculation for each of the selected/strongest signals selected via RSSI level. In the example provided in Table 2 below, Trailers 137 and 139 may be excluded from further analysis based on their low RSSI levels. Thereafter, Angle of Departure/Angle of Arrival analysis may be performed on the remaining identified trailers.

At a next step 156, the system then may preferably determine which of the closest identified trailers have an Angle of Departure/Angle of Arrival which falls within a pre-set threshold. In the example provided in Table 2, angle analysis is performed with respect to signals from Trailers 132, 134 and 136. From this analysis, Trailer 134 may be identified as having an Angle of Arrival/Angle of Departure which is within an exemplary pre-determined threshold level (e.g., <10°). Based on this analysis, the system may determine that Trailer 134 is the trailer hooking-up with the subject truck.

TABLE 2

| Detected Trailer | Trailer ID Device | Detected RSSI Level | Determined Angle of Arrival/Angle of Departure |
|---|---|---|---|
| Trailer 132 | 138 | 95 | 45° |
| Trailer 134 | 140 | 91 | 5° |
| Trailer 136 | 142 | 89 | 58° |
| Trailer 137 | — | 44 | NA |
| Trailer 139 | — | 28 | NA |

At a next step 158, the Trailer ID device (e.g., 140) of the selected trailer (e.g., Trailer 134) which meets both the RSSI and Determined Angle criteria is preferably paired with the attaching Tractor ID device 145 of the truck 120.

With reference now to FIG. 6, at a next step 160, the system preferably transmits the paired ID information as needed to the in-cab device and/or to any back-end server. Preferably, the linking of the Tractor ID device and the Trailer ID device shall occur prior to departing a given yard, depo or a given geofenced area.

At a next step 162, the system of the present invention may preferably detect and confirm the unhooking of a given trailer by first identifying the occurrence of a selected criteria indicating unhooking and/or direct user input. These criteria may include any criteria including the exemplary criteria listed in Table 3 below.

TABLE 3

| Unhook Scanning Criteria | Optional Co-incident Criteria |
|---|---|
| Entry into Geofence | Currently hooked to a trailer. Stop and/or Reverse Motion |
| Stop and/or Reverse Motion | Currently hooked to a trailer. |
| Proximity to a selected number of trailers | Currently hooked to a trailer. Truck speed below selected value. |
| Change in RPM/Gear Characteristics | Currently hooked to a trailer. Truck speed below selected value. Detected grade/slope within a predetermined range (grade < Y°). |
| Change in RSSI levels | RSSI Detection of other trailers |
| Millimeter-wave radar proximity detection | Tractor outside a predetermined distance from the trailer |

At a next step 164, at the detection of criteria indicating unhooking, the system may detect the Angle of Arrival/Angle of Departure for the currently paired trailer. At a next step 165, the system may then determine when the detected angle exceeds a preset threshold (e.g., Angle>X°) and determine that the trailer has been unhooked. As discussed above, if a directive antenna is used, steps 164 and 165 may be skipped.

At a next step 168, the system may then proceed to unpairing the Tractor ID device from the Trailer ID device. At a next step 170, the system may then preferably record and transmit the unpairing and the drop-off location information of the trailer to the in-cab device and/or to a system back-end server. For an embodiment without AoA, such as BLE5.0, the system may detect a reduction in RSSI and/or a change in the reading from the proximity sensor.

The present invention has been disclosed above with reference to several examples. These examples are not intended to be limiting. Instead, the scope of the present invention should be determined purely by the terms of the appended claims and their legal equivalents.

What is claimed is:

1. A method for identification by a first truck of a first towed trailer in a loading area, wherein the method comprises the following steps:
    monitoring hook-up criteria indicating that the first truck is maneuvering to hook-up with the first trailer; wherein the hook-up criteria comprise sensor output indicating a stop motion of the truck and the detection of proximity to the first trailer;
    scanning for one or more transmitting devices when hook-up event criteria are met; where the one or more transmitting devices comprise transmitting devices identifying one or more identified trailers;

determining which transmitting devices are sufficiently close to require an angle calculation; wherein the determination of proximity to a transmitting device is performed by a Received Signal Strength Indicator (RSSI) Comparator which identifies signals which exceed set RSSI levels;

performing an Angle of Departure/Angle of Arrival calculation for each of the selected signals;

determining which of the closest identified trailers have an Angle of Departure/Angle of Arrival which falls within a pre-set threshold;

identifying a hook-up trailer based on detecting the Angle of Arrival/Angle of Departure and the compared RSSI levels;

pairing the hook-up trailer ID device with a tractor ID device of the first truck; and transmitting paired ID information linking the hook-up trailer ID and the tractor ID device.

* * * * *